Dec. 5, 1967

P. J. DE GEORGE 3,356,200

ZONE AND LINE FINDING

Original Filed May 22, 1964

INVENTOR.
PETER J. DeGEORGE

BY John A. Brady
ATTORNEY.

United States Patent Office 3,356,200
Patented Dec. 5, 1967

3,356,200

ZONE AND LINE FINDING

Peter J. De George, Lexington, Ky., assignor to International Business Machines Corporation, New York, N.Y., a corporation of New York Continuation of application Ser. No. 369,516, May 22, 1964. This application Oct. 26, 1966, Ser. No. 589,763
9 Claims. (Cl. 197—127)

ABSTRACT OF THE DISCLOSURE

The preferred embodiment described is a system to find the next available line for printing in a selected one of three zones on one side of a document. The document has punched holes in one track situated along the side of the document in positions corresponding to lines in each zone which are not available for being printed upon. As the edge of the document is moved, that is observed for two of the zones by document presence switches spaced along the feed path at positions corresponding to the boundaries of the different zones. (An alternative embodiment with cams to sense the zone boundaries is also disclosed.) A star wheel sensing device observes for the punched holes. A parallel circuit including switches to precondition the circuit is provided. When the circuit is preconditioned for a selected one of two of the zones, then the document presence switch for the boundary of that zone is effective to close the one leg of the parallel circuit. The parallel circuit has a normally closed switch in one branch so that when that switch is left closed, the effective search will be for punched holes in the first presented of the three zones. The parallel circuit connects to a switch closed by the star wheel, and completion of a branch of the parallel circuit and the star wheel switch is made operative to stop feeding of the document. A zone full protection is also included. As the boundary of a zone passes the printing means, a signal is initiated which passes during the time a capacitor is charged, and concurrence of that signal with a star wheel signal is used to eject the document.

This is a continuation of application Ser. No. 369,516, filed May 22, 1964, now abandoned.

This invention relates to the positioning of a document in operative and proper relation to recording means. More specifically, this invention is concerned with the positioning of a document with relation to recording means so that the available, record receiving area in any of a plurality of predesignated zones within the document can be properly located. In the preferred embodiment the recording means is a stationary printer and means are provided to move a document in front of the printer and to stop the document at the next available unprinted line in a zone, each zone being an area comprising part of the vertical length of the document and all of the horizontal width of the document. Also included in this specification are means to automatically observe when one of the predesignated zones no longer contains available positions to receive recordings.

The locating of the next available line on a document to receive printed or similarly recorded information is done in several ways in the prior art. It is known to print or punch indicia in the document as each available line is recorded upon. Such indicia are each located in positions analogous to the location of the filled lines, and the next available line is later found by sensing the indicia with means which stop the document one line away from the last indicia placed on the document. It is also known to place indicia on a document prior to use of the document, the indicia being placed at locations related to certain lines on the document or all of the lines on the document. Machine logic is then provided to remember the last line printed upon and to find the next available line by observing the indicia as the document is moved. In addition to the above, it is often desired to find the starting position of certain preselected locations on a document such as the heading portion of a form, the body portion of a form, and the closing section of a form. This might be called format finding. Often electronic logic is used in conjunction with indicia moved with the document to accomplish format finding.

It need only be pointed out here that the invention herein described is not concerned with format finding or with simply locating the next available line. Indeed, the invention in its broad concept includes as one of its several elements any means to simply locate a next available line or similar available recording position. The invention differs from all of the prior art mentioned above and from similar art in that means are provided sensitive to a zone within the document. Line finding is accomplished within zones by a coaction between means sensitive to the position of a zone and means sensitive to structures indicative of the next available line. Zone finding is believed to be known in the prior art, but the known techniques are largely dependent upon complicated memory schemes and complicated logic. In at least one known scheme it is believed that the next available line in each zone must be remembered electronically, and completely different indicia sensing means are used with each zone. In this invention, a single scheme to find the next available line can be used with a single set of indicia recorded permanently on the document.

Although the advantages of simple and efficient zone and line finding are largely evident, it should be noted that zone and line finding is useful in utilizing a document related to one major class for recording of items in related subclasses. The document might, for example, be a payroll record for a given employee. The employee is thus the major class to which the document relates. Each employee often has fixed deductions associated with him which should be recorded in a particular zone on the document. Obviously, mechanical zone and line finding means are highly desirable if they can be implemented without inordinate structure or expense.

Another illustrative application is in using zone and line finding means to change the prices of different classes of items on inventory cards. It should also be recognized that the major class-related subclass processing scheme is not the only value of the use of zones. Several major classes of small volume can be stored on different zones of a single document, thus reducing total storage space required for documents.

The zone finding scheme of this invention requires only a minimum of structure over that found in the most efficient line finding system. In accordance with the invention, means are provided to observe document travel and to thereby sense when the boundary of a zone of a card comes operatively near the record receiving position established by the position of the recording means. The means to observe document travel are associated with selective means such as a keyboard or a logical condition of some kind to cause the means to observe document travel to provide an operative response only with respect to the boundary of a zone which has been preselected by the selective means. The operative response then activates line finding means which may be present but inactive prior to the response condition of the means to observe document travel.

In accordance with the invention analog means are preferred as a means to observe document travel. Such means respond to the change in spacial positions inherent in and thus readily available in any line finding system. In accordance with the preferred embodiment herein described analog means are provided of particular utility. These means are card presence switches located at properly selected points in the document feed path. Each card presence switch is at a point analogous to the boundary of a zone as it moves operatively near the recording means. Card presence switches can be inexpensive, reliable, and small.

An automatic zone full feature has been devised for use in conjunction with the zone and line finding herein described. Such a feature is highly desirable, of course. Without a zone full feature, some kind of a manual observation by an operator would be necesary each time a card is used to insure that the zone of the document to be used is not full.

In accordance with the automatic zone full feature, the document is fed in a direction so that the bottom of each zone leads the top of each zone in the document feed path. The operative response of the means to observe document travel and of a signal from the line finding means indicative of a line full condition are ANDed upon the initial response of the means to observe document travel. During this time existence of a full line signal from the line finding means indicates that the zone is full. The output of the AND logic thus is indicative of a full zone and can be used to automatically eject the document.

It is an object of this invention to provide zone and line finding means which are simple and economical.

It is a further object of this invention to provide zone and line finding means which can effectively utilize known techniques in line finding and existing structures found incident to such known techniques.

It is an object of this invention to provide an efficient and economical line full eject means for a zone and line finding system.

The foregoing and other objects, features and advantages of the invention will be apparent from the following more particular description of preferred embodiments of the invention, as illustrated in the accompanying drawings.

Figures 1, 2, 3, 3A, 4, 5:
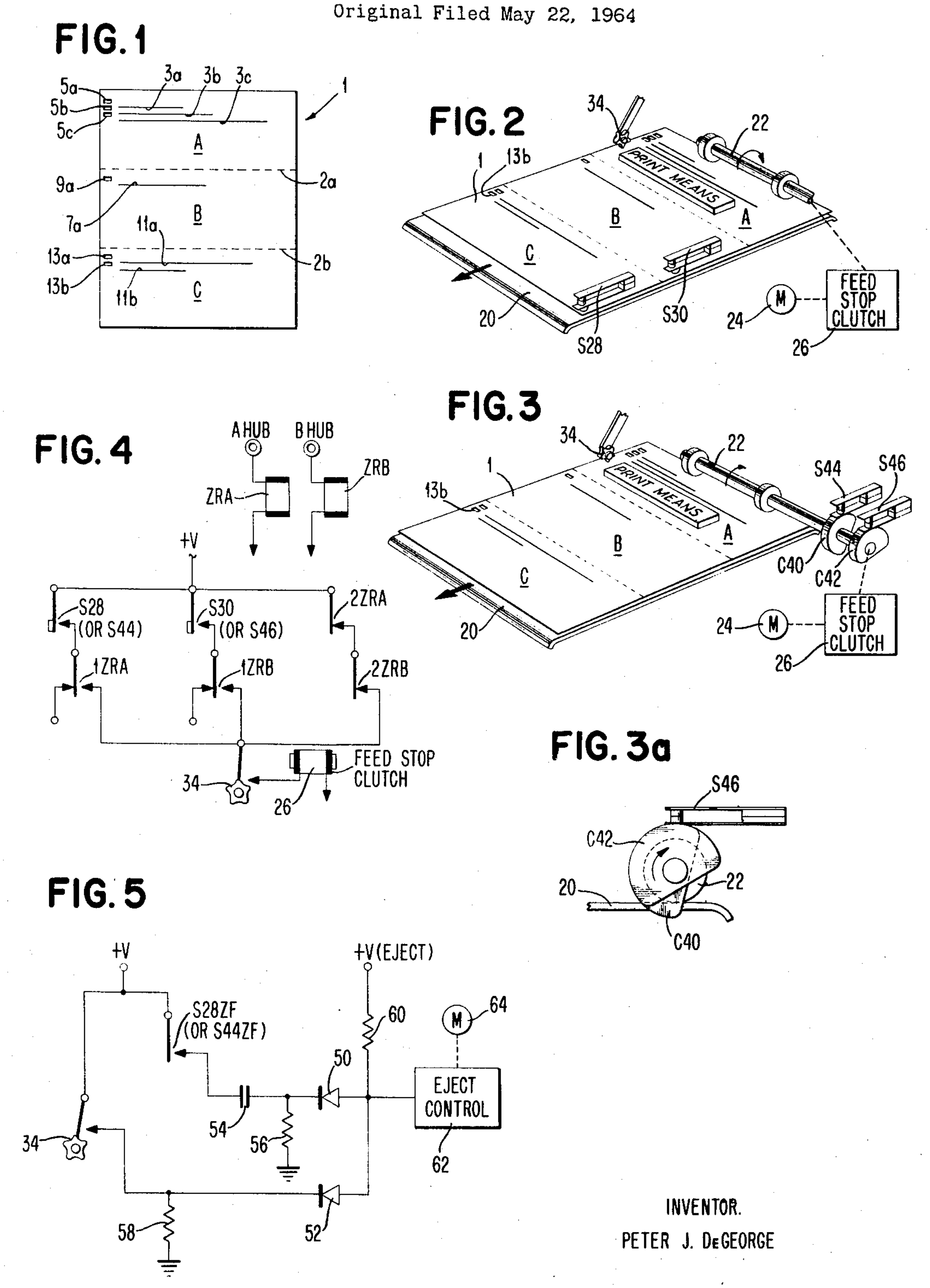
FIG. 1 illustrates a ledger card used in the preferred embodiment of the invention.
FIG. 2 illustrates the card feed arrangement of the inventive specific embodiment, with card presence sensing switches properly located along the document feed path.
FIG. 3 illustrates another embodiment of the invention with cams linked to a document feed roll to indicate the extent of movement of the document.

FIG. 3*a* is a side view of the cams in FIG. 3.

FIG. 4 illustrates the circuitry of the preferred embodiment of the zone and line finding invention.

FIG. 5 illustrates the circuitry of the preferred embodiment of the zone full means.

*The document*

FIG. 1 shows the document 1 used and is therefore helpful in understanding the functions of the invention. Three zones, A, B, and C are shown on the card, and for purposes of illustration, they are separated on the drawing by dotted, imaginary lines **2*a* and 2*b*. Three lines of printing on Zone A are suggested by solid lines 3*a*, 3*b*, and 3*c*. Each line of printing has been permanently indicated so that it can be remembered by punched holes 5*a*, 5*b*, and 5*c* on the card. The line 3*a* is, of course, positioned in space in a predetermined relationship to hole 5*a*. This is also true for the other lines and holes. In Zone B, one printed line 7*a* exists and therefore one hole 9*a* is punched at the side. Zone C has two printed lines 11*a* and 11*b* and therefore has two associated holes, 13*a* and 13*b***.

The document shown in FIG. 1 is a ledger card operated in conjunction with an accounting machine. Tabulation results, data, summaries, and information of any kind may be printed on the ledger card. If the accounting machine used with the ledger card is an electronic one such as those recently appearing in the market place, the ledger card may carry a horizontal stripe of magnetic material near the bottom of the card. The magnetic stripe serves as an electronic memory which can be read from and written into at high speeds. The printed portions of the card serve as written records well suited for individual use as such by accountants and other persons.

The card is, in this application, divided into preselected zones, labeled A, B, and C. The card may be a payroll record of one employee. Zone A might therefore represent periods worked, and lines **3*a*, 3*b*, and 3*c* would be written statements that so many hours were worked at certain times. Zone B might represent job and salary status. Thus, line 7*a* would be written statements that the employee was employed on a certain job and at a certain pay rate. Zone C might represent fixed deductions, and lines 11*a* and 11*b*** would be statements concerning facts such as marital status and dependents.

*Card presense assembly*

The poblems to be solved herein, of course, is to provide means to automatically bring the next available line for printing in a selected zone to a printing station. FIG. 2 illustrates a structure particularly well suited to accomplish this in accordance with the invention. FIG. 2 shows the document 1 resting on a feed guide bed 20. The bed 20 merely provides structural support for a document to be slid along a document feed path. The document 1 is moved by friction roll 22. Friction roll 22 is dimensioned from the guide bed 20 at a distance such that it will make a friction contact with the document 1 and force it along the guide bed 20 in response to a rotation by the friction roll 22. The friction roll 22 is driven by a motor 24 and may be activated and deactivated by the feed stop clutch 26 located operationally between the motor 24 and the friction roll 22.

The zone and line finding means comprise document presence sensing switches S28 and S30. The precise location along the document feed path of each of the switches S28 and S30 is important to the invention as is the circuitry in which the switches are used. This is discussed below. The star wheel 34 is biased to drop into and thereby sense punched holes. The star wheel 34 makes an electrical contact upon sensing a hole, as is made clear in FIGS. 4 and 5.

*Cam assembly*

The document presence sensing switches S28 and S30 may be replaced by a cam arrangement shown in FIGS. 3 and 3*a*. FIG. 3 differs from FIG. 2 in having two cams C40 and C42, mounted on the shaft of friction roll 22. Each cam has associated with it a switch. Thus cam C40 is spaced with relation to switch S44 so that its high side will close switch S44. Similarly cam C42 will close switch S46. To assure complete clarity, FIG. 3*a* shows an end view of the cam portions of FIG. 3.

*Finding circuitry*

FIG. 4 shows the circuitry of the invention. Circuitry is provided to activate the feed stop clutch 26 at the desired position. A power source, +V is provided for this purpose. The circuit must be first preconditioned to search for the last line in the zone which is desired. Preconditioning is obtained by picking the proper zone relay ZRA or ZRB. The zone relays ZRA and ZRB are shown above the other circuitry. The zone relays may be operated selectively at the choice of the operator of the machine or may be operated selectively automatically by the machine. The relay which preconditions the circuit to respond to Zone A is designated ZRA (zone relay A). The relay which preconditions the circuit to respond to Zone B is similarly designated ZRB. A Zone C response can be obtained by simply not picking the other zone relays. The circuit connections designated A Hub and B Hub are suggestive of the circuit as it would be used with an electronic accounting machine capable of producing an electric pulse in response to machine arrangements or programming in any of the now well known manners. It will also be evident that the relays ZRA and ZRB can be replaced by switches manually moved into place. Manual switches would allow keyboard control.

The card presence switches S28 and S30 and, in the alternative embodiment, the cam switches S44 and S46 are normally open. Both ZRA and ZRB have two contacts. The contacts 1ZRA and 1ZRB are normally open. The contacts 2ZRA and 2ZRB are normally closed. Parallel circuits are provided between +V and the star wheel 34. Star wheel 34, upon activation, makes a circuit to feed stop clutch 26. One branch of the parallel circuits, which is related to Zone C finding, consists of 2ZRA and 2ZRB in series. A second branch of the parallel circuit is related to Zone B finding; it consists of S30 (or S46) in series with 1ZRB. The third branch consists of S28 (or S44) in series with 1ZRA; this branch is related to Zone A finding.

*Operation of finding means*

The zone and line finding means operate as follows: A bottom edge of the C Zone of ledger card 1 is brought into contact with the friction roll 22 (FIGS. 2 and 3). Card feeding is then begun. Assuming that neither ZRA nor ZRB is activated, the Finding Circuit is in the status shown in FIG. 4. This is a Zone C finding status. Contacts 2ZRA and 2ZRB make a normally active circuit directly to the star wheel 34. The feed stop clutch 26, however, is not activated until the star wheel 34 finds a punched hole to thereby close its contact to the feed stop clutch 26. The card is therefore fed bottom edge first in a leftward direction as shown in FIGS. 2 and 3 until the star wheel 34 finds punched hole 13*b*. The star wheel is, of course, displaced slightly more than one print line from the printing means so that the closing of a circuit to the feed stop clutch 26 stops the ledger card 1 one line below that next full line. This can be summarized broadly by stating that the contact is made near the next available printing position.

Finding in Zone A produces somewhat different requirements. The ledger card 1 must be moved past the printing means completely through Zones C and B. The star wheel 34 will close a circuit to the feed stop clutch 26 within all zones. When ZRA is picked, the circuit of FIG. 4, however, renders the star wheel sensing of punched holes ineffective until Zone A is reached. The picking of ZRA opens 2ZRA, thus rendering unresponsive the series circuit of 2ZRA and 2ZRB. The circuit of S30 (or S46) and 1ZRB is unresponsive because 1ZRB is not picked. The closed 1ZRA contact, however, brings the star wheel 34 into a circuit made effective when S28 (or S44) is closed by the positioning of the document 1.

Zone B finding is accomplished when ZRB is picked. Finding in Zone C is then not possible because 2ZRB is then open. The scheme is thus substantially the same as that used in Zone A finding. It will be apparent that the circuit scheme is capable of expansion according to the same scheme to provide for zone and line finding in any number of zones. It is necessary only that the selection of a zone relay or switch (such as ZRA) provide a constantly open circuit in every branch of the parallel circuit except that branch related to the zone in which finding is to occur.

The importance of the analogue means to the invention is illustrated by the above explanation. The switches S28 and S30 of FIG. 2, for example, constitute analogue means. Unless the position of the card is properly represented by the closing of a switch by analogue means, a circuit may be made while the star wheel 34 is responsive to holes punched in the incorrect zone.

Analogue means comprising card presence sensing switches such as S28 and S30 shown in FIG. 2 constitute a particularly efficient and inexpensive provision of analogue means. On the other hand, the cams shown in FIGS. 3 and 3*a* have the advantage of being more easily adjusted to different requirements and being more accessible to maintenance. A paper or plastic tape with appropriate punched holes and linked to friction roll 22 could also serve as appropriate analogue means. The cams linked to the friction roll must, of course, be located at a given starting point at the start of document travel. This can be done automatically or manually.

It will be noted that the line finding means used are in no way complicated by the invention. A single track for punched holes and a single star wheel similar to that used in the prior art are perfectly suitable to use in this invention and, indeed, are preferred. By observing zone boundaries in the manner of the invention a highly efficient combined structure is created.

*Printing and punching*

It will be noted that printing and punching has not been described in detail. It is necessary, of course, that the printer move laterally relative to the document or in some other way be capable of printing an entire line. It is also necessary that a punched hole be added to the document in the proper place when a line has been printed upon. Such means are known in the art, however, to the extent that explanation herein is unnecessary. Patent 2,297,743 and Patent 2,111,116 are cited as examples only to establish the state of the art in punching. A single element type head printer, which element contains an entire type font, is well suited to printing along the line of a document held in guide means. Such printing means are widely sold by the assignee of this patent application and such printing means are also presently sold in an accounting machine to print on a ledger card in a manner similar to that above described. It may be necessary with some printing means to utilize a curved document feed path so as to provide space for the mechanism of the printer. However, the invention is clearly fully operative in the manner described whether the document feed path is straight or curved. It should be emphasized, however, that the zone and line finding scheme herein described is a recent development and further that the applicant believes the type of printing means used to be a matter of choice and not a limitation on the invention herein described.

*Zone full eject*

FIG. 5 shows the circuitry for the automatic response when a zone is completely filled with recorded information. The two diodes 50 and 52 are forward biased to +V (EJECT) and make up an AND logical configuration. The potential +V connects through the star wheel 34 to diode 52. The circuit shown is one which will respond to a full condition of Zone A. The potential +V connects through a normally open contact S28ZF (zone full) of S44ZF, depending upon whether the embodiment is that of FIG. 2 or FIG. 3. A capacitor 54 isolates the switch S28ZF (or S44ZF) from the diode 50. Current bypass resistors 56 and 58 of intermediate magnitude are provided in both the star wheel and the zone full switch circuit. The potential +V (EJECT) connects to the diodes 50 and 52 through a current limiting resistor 60. The diodes 50 and 52 and the resistor 60 are connected to an eject control 62. Eject control 62 preferably is powered by a motor 64 to completely drive a ledger card out of the machine.

In operation, documents are fed with the bottom boundary of their zones leading. The capacitor 54 isolates +V from diode 50 by its being substantially charged in less time than required for a document to move to a new line. Thus, if the star wheel 34 finds a punched hole at the time the analogue switch S28 (or S44) finds the bottom boundary of a zone, the two diodes function in the well known manner as an AND circuit, and the eject control 62 is activated. If the star wheel 34 makes its contact later, however, the capacitor 54 isolates +V from diode 50 and no eject occurs. The later finding by the star wheel is inherent, of course, unless the Zone A is completely full.

Although FIG. 5 shows a circuit for only Zone A, similar arrangements can be added for the other zones. As discussed above, no analogue sensing switch is needed for zone finding within Zone C. For the Zone C full eject function, however, a switch can be added responsive to the passing of the bottom of the boundary of Zone C in front of the printing means.

While the invention has been particularly shown and described with reference to preferred embodiments thereof, it will be understood by those skilled in the art that the foregoing and other changes in form and details may be made therein without departing from the spirit and scope of the invention.

I claim:

1. Zone and line finding means for a document having at least two zones to receive recorded information on one side of said document, each said zone containing a plurality of lines, said document having at least one edge and normally carrying indicia on a single track representative of lines available for recording in said zones comprising:

document recording means, means to move said document relative to said document recording means to position said document for recording by said document recording means on different lines of different of said zones, the relative movement being in a direction in which said one edge moves in a direction intersecting said document recording means, means to sense said indicia, at least a first means to find the location of a said zone, said first means to find the location of a zone comprising means responsive when said one edge of said document is moved one predetermined amount in a direction intersecting said document recording means to create a response condition when a predetermined location defining one of said zones is in a predetermined spacial relationship to said recording means, means to inhibit said means to move said document, selectable means selectable to at least a first state and a second state in which different conditions are created, means responsive to the concurrence of conditions comprising the results sensed by said indicia sensing means and the condition created by said selectable means when in said first state, and also responsive to the concurrence of conditions comprising the results sensed by said indicia sensing means, said response condition of said first means to find the location of a zone, and the condition created by said selectable means when in said second state, to cause said means to inhibit said means to move said document to be effective to cause the next available line for recording in one of said zones to be found when said selectable means is in said first state and to be effective to cause the next available line for recording in another of said zones to be found when said selectable means is in said second state.

2. The combination as in claim 1 in which said means responsive when said one edge of said document is moved a predetermined amount comprises means linked to said means to move said document.

3. The combination as in claim 1 in which said means responsive when said one edge of said documents is moved a predetermined amount comprises means situated in the path of the movement of said one edge and responsive to the occupation of space by said document.

4. The combination as in claim 3 in which said response condition created by said first means to find the location of a zone comprises the closing of a first, normally open contact, in which said selectable means comprises a second contact closed when said selectable means is in said first state and opened when said selectable means is in said second state, and in which said means responsive to the concurrence of conditions comprises a parallel circuit of at least two legs, one leg comprising said first, normally open contact, and the other leg comprising said second contact, and said indicia sensing means controls a normally open contact which is closed in response to the sensing of said indicia, said contact controlled by said indicia sensing means being in series circut with both said legs of said parallel circuit so that said means to inhibit said means to move said document is controlled by a closed circuit through at least one leg of said parallel circuit and said series circuit.

5. The combination as in claim 1 also comprising:

at least a second means to find the location of a different of said zones, said second means to find the location of a zone comprising means responsive when said one edge of said document is moved one predetermined amount in a direction intersecting said document recording means to create a second response condition when a predetermined location defining a second of said zones is in a predetermined spacial relationship to said recording means, and in which said means responsive to the concurrence of conditions comprising the results sensed by said indicia sensing means and the condition created by said selectable means when in said first state is responsive only when said response condition of said second means to find the location of a zone also concurs.

6. The combination as in claim 5 in which both said means responsive when said one edge of said document is moved a predetermined amount each comprise means linked to said means to move said document.

7. The combination as in claim 5 in which both said means responsive when said one edge of said document is moved a predetermined amount each comprise means situated in the path of movement of said one edge and responsive to the occupation of space by said document.

8. Zone full detecting means for a document having at least two zones to receive recorded information on one side of said document, each zone having at least one boundary, said document normally carrying indicia representative of available positions for recording in said zones comprising:

means to move said document, means to observe by sensing said indicia and create a first response condition when an area on said document passing a predetermined point is not available for recording, means to create a second response condition effective for a short time after said second response condition is created, said short time being relative to the time required for substantial movement of said document, when a boundary of said zones moves past a predetermined point, and logical AND means operatively connected and responsive to the concurrence of said first response condition and said second response condition to create a third response condition representative of zone full.

9. The combination as in claim 8 in which said second response condition is created by means comprising:

means to create a continuing signal when said document is moved a predetermined amount defining the location of one zone, means communicating said continuing signal to said logical AND means, and means to isolate said continuing signal from said logical AND means said short time after said continuing signal is created.

References Cited

UNITED STATES PATENTS

| | | | |
|---|---|---|---|
| 1,071,780 | 9/1913 | Neidig et al. | 197—189 |
| 2,213,571 | 9/1940 | Simpson et al. | 197—127 |
| 2,558,947 | 7/1951 | Furman | 197—127 |
| 2,832,454 | 4/1958 | Martin | 197—127 |
| 2,917,153 | 12/1959 | Westover | 197—133 |
| 2,944,651 | 7/1960 | Malcolm et al. | 197—133 |
| 2,983,357 | 5/1961 | Estrems et al. | 197—133 |
| 3,014,570 | 12/1961 | Cunningham | 197—133 |
| 3,019,881 | 2/1962 | Cetran et al. | 197—133 X |
| 3,020,996 | 2/1962 | D'onofrio | 197—133 |
| 3,174,610 | 3/1965 | Barbagallo et al. | 197—133 |

FOREIGN PATENTS

| | | |
|---|---|---|
| 935,908 | 12/1955 | Germany. |

ROBERT E. PULFREY, *Primary Examiner.*

E. T. WRIGHT, *Examiner.*